(12) United States Patent
Ptucha et al.

(10) Patent No.: US 7,570,829 B2
(45) Date of Patent: Aug. 4, 2009

(54) SELECTION OF ALTERNATIVE IMAGE PROCESSING OPERATIONS TO MAINTAIN HIGH IMAGE QUALITY

(75) Inventors: Raymond W. Ptucha, Honeoye Falls, NY (US); William V. Fintel, Rochester, NY (US); Andrew C. Gallagher, Brockport, NY (US); Edward B. Gindele, Rochester, NY (US); Jeffrey C. Snyder, Fairport, NY (US); Kevin E. Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 852 days.

(21) Appl. No.: 11/059,935

(22) Filed: Feb. 17, 2005

(65) Prior Publication Data

US 2006/0182361 A1  Aug. 17, 2006

(51) Int. Cl.
*G06K 9/62* (2006.01)
*G06K 9/40* (2006.01)

(52) U.S. Cl. ...................... 382/254; 382/156
(58) Field of Classification Search ......... 382/155–158, 382/254, 270–273, 260–261
See application file for complete search history.

(56) References Cited

U.S. PATENT DOCUMENTS

| | | | |
|---|---|---|---|
| 5,012,333 A | 4/1991 | Lee et al. | |
| 5,694,484 A | 12/1997 | Cottrell et al. | |
| 5,896,465 A * | 4/1999 | Coppola | 382/232 |
| 6,285,798 B1 | 9/2001 | Lee | |
| 6,317,521 B1 | 11/2001 | Gallagher et al. | |
| 6,813,389 B1 * | 11/2004 | Gindele et al. | 382/274 |
| 6,856,702 B2 * | 2/2005 | Gallagher | 382/254 |
| 7,054,484 B2 * | 5/2006 | Lyford et al. | 382/167 |
| 2003/0156078 A1 * | 8/2003 | Iwase et al. | 345/30 |
| 2005/0024651 A1 * | 2/2005 | Yu et al. | 358/1.9 |
| 2005/0125505 A1 * | 6/2005 | Kim et al. | 709/219 |
| 2005/0254727 A1 * | 11/2005 | Fedorovskaya | 382/286 |
| 2005/0276505 A1 * | 12/2005 | Raveendran | 382/268 |
| 2006/0126962 A1 * | 6/2006 | Sun | 382/268 |
| 2006/0197938 A1 * | 9/2006 | Halmos et al. | 356/5.04 |

OTHER PUBLICATIONS

U.S. Appl. No. 09/742,957, filed Dec. 20, 2000, A Multiresolution Based Method for Removing Noise From Digital Images, Edward B. Gindele.

U.S. Appl. No. 10/151,623, filed May 20, 2002, Calculating Noise Estimates of a Digital Image Using Gradient Analysis, Navid Serrano et al.

(Continued)

*Primary Examiner*—Matthew C Bella
*Assistant Examiner*—Nathan Bloom
(74) *Attorney, Agent, or Firm*—Robert L. Walker (57) ABSTRACT

In an image enhancement method, a regular enhancement function and an aggressiveness parameter are computed using characteristics of a digital image. A first, relatively slow enhancement algorithm is applied to the digital image using the regular enhancement function, when an aggressiveness parameter is in a predetermined high range. A second, relatively fast enhancement algorithm is applied to the digital image using the regular enhancement function, when an aggressiveness parameter is in a predetermined low range. A modified enhancement function is calculated using characteristics of the digital image and is used with a second, relatively fast enhancement algorithm, when the aggressiveness parameter is in a predetermined medium range.

56 Claims, 5 Drawing Sheets

OTHER PUBLICATIONS

U.S. Appl. No. 10/178,260, filed Jun. 24, 2002, Enhancing the Tonal Characteristics of Digital Images, Edward B. Gindele.

U.S. Appl. No. 10/246,856, filed Sep. 19, 2002, Enhancing the Tonal Characteristics of Digital Images Using Infection Points in a Tone Scale Function, Edward B. Gindele.

U.S. Appl. No. 10/263,113, filed Oct. 2, 2002, Enhancing the Tonal and Color Characteristics of Digital Images Using Expansive and Compressive Tone Scale Functions, Edward B. Gindele et al.

U.S. Appl. No. 10/280,369, filed Oct. 25, 2002, Enhancing the Tonal, Spatial, and Color Characteristics of Digital Images Using Expansive and Compressive Tone Scale Functions, Edward B. Gindele et al.

U.S. Appl. No. 10/607,401, filed Jun. 26, 2003, A Method of Processing an Image to Form an Image Pyramid, Andrew Gallagher et al.

"Methods to Reduce the Amplification of Random Noise in the Color Processing of Imager Data", McCleary et al., IS&T's 2003 PICS Conference Proceedings, pp. 50-57.

* cited by examiner

SELECTION OF ALTERNATIVE IMAGE PROCESSING OPERATIONS TO MAINTAIN HIGH IMAGE QUALITY

FIELD OF THE INVENTION

This invention relates to digital image processing and in particular to a method for selecting between alternative image processing operations so as to maintain high image quality in the tradeoff between image processing complexity and processing speed.

BACKGROUND OF THE INVENTION

Image processing of digital images often avoids complex image processing operations that yield high image quality in favor of faster image processing operations that yield inferior image quality. The net result is that most commercially available image processing packages offer less than optimal image quality performance because to achieve said performance would be prohibitive from a processing time perspective.

If speed or memory constraints were not an issue, the complex image processing operation would be run exclusively. For many images, only the complex image processing operation can yield high image quality. However, on a significant subset of images, the application of a complex image processing operation does not produce significant improvement in image quality over a faster image processing operation. It would therefore be valuable to have a mechanism for applying the more complex image processing operations for only the images that would see improved image quality to obtain the maximum value while not adversely affecting the average system throughput.

U.S. patent application Ser. No. 10/178,260, filed Jun. 24, 2002 by Gindele et al., hereby incorporated herein by reference, describes a method for generating a one-dimensional look-up table for improving the tone scale of an input digital image. This tone scale can then be applied directly to the three color channels, or can be applied solely to a low-frequency sub band of the luminance channel. The former approach is fast, but achieves poor image quality when the one-dimensional look-up table has a low slope. The latter approach is slow, but achieves high image quality when the one-dimensional look-up table has a low slope. By inspecting the slope of the one-dimensional look-up table, a decision can be made as to which enhancement algorithm technique to use. For images with very low or high slopes, this decision is straightforward. For slopes in the middle, this decision is difficult and likely to result in objectionable artifacts if the wrong choice is made.

U.S. Pat. No. 5,694,484, to Cottrell et al., describes a method of building an image processing system with an automated intelligent control mechanism for controlling a collection of algorithms and adjustable parameters. The determination of which algorithm or what parameters is based upon predictor values that are calibrated in controlled psychophysical experiments. The end result is images of high quality. This approach has the shortcoming of being complex and can result in discrete and distinct levels of image quality as different algorithms are switched on and off.

Many different types image enhancements have algorithms and functions that differ in speed and quality.

The contrast and lightness characteristics of digital images are commonly enhanced through the application of a tone scale curve. For a generalized tone scale curve f( ), the input pixel value x is transformed to an output pixel value f(x). The shape of the tone scale curve determines the visual effect imparted to the processed digital image. Some tone scale curves applied to digital images are independent of the pixel values in the digital image to be processed. For example, image independent tone scale curves can be useful for establishing a photographic look to processed digital images. While image independent tone scale curves can be used to enhance many digital images, digital images that are either too high or low in contrast can benefit from the application of a tone scale curve that is responsive to the distribution of pixel values in the digital image to be processed. For image dependent tone scale curves, the mathematical formula used to generate the function f(x) determines the degree and nature of the image enhancement.

U.S. Pat. No. 6,285,798, to Lee, which is hereby incorporated herein by reference, discloses a method of generating a tone scale curve for the purposes of reducing the dynamic range of a digital image. The tone scale curve construction method establishes six constraints and then performs a successive integration procedure to satisfy the constraints. U.S. patent application Ser. No. 10/178,260, to Gindele, which is hereby incorporated herein by reference, describes generation of a tone scale function having a highlight tone scale segment and a shadow tone scale segment.

Image enhancement algorithms are well known that apply a tone scale function directly to the red, green, blue (RGB) color planes of a digital image. These algorithms produce images of generally quite high quality, but have the shortcoming of a tendency to reduce texture in some images.

U.S. Pat. No. 5,012,333, to Lee et al., which is hereby incorporated herein by reference, discloses an image enhancement algorithm, which applies a tone scale function to a low frequency sub-band of the image, while preserving higher frequency sub-bands that are considered image texture. U.S. Pat. No. 6,317,521, to Gallagher et al., which is hereby incorporated herein by reference, discloses a similar algorithm, which incorporates an artifact avoidance scheme along with a single standard Finite Impulse Response (FIR) filter to generate the texture signal, in order to reduce the occurrence of artifacts in the final image. U.S. patent application Ser. No. 10/607,401, by Gallagher, which is hereby incorporated herein by reference, describes a method of applying highly compressive tone scale functions to digital images by processing a digital image to form an image pyramid having multiple image levels. These algorithms produce images of high quality while largely preserving texture, but are quite computationally expensive to run in comparison to applying a tone scale function directly to the RGB color planes. Other examples of tone scale functions and algorithms disclosed in U.S. patent application Ser. No. 10/246,856, filed Sep. 19, 2002; Ser. No. 10/263,113, filed Oct. 2, 2002; and Ser. No. 10/280,369, filed Oct. 25, 2002, all of which are hereby incorporated herein by reference.

It is well known to apply color corrections uniformly to an image. On the other hand, "Methods to Reduce the Amplification of Random Noise in the Color Processing of Imager Data", McCleary, IS&T's 2003 PICS Proceedings, pp. 50-57 teaches that applying color correction to sufficiently noisy images will result in superior image quality if more accurate color correction functions are applied to the low frequency sub-band of the image while less accurate or unity (no change) color correction functions are applied to the higher frequency bands of the image.

Different noise filters are well known, as are different algorithms that apply noise filters. U.S. patent application Ser. No. 10/151,623, filed May 20, 2002, by Gindele, which is hereby incorporated herein by reference, discloses a method of computing a noise estimate for a digital image, which uses gradient analysis on the source digital image and pixels in a plurality of orientations to calculate a noise characteristic value. U.S. patent application Ser. No. 09/742,957, filed Dec. 21, 2000, by Gindele, which is hereby incorporated herein by reference, discloses a method that allows customized noise filtering of both basis and texture images at each level of a multi-resolution or pyramidal resolution series containing a single low resolution basis image and a series of texture images of increasing resolution. Alternatively, one can form a luminance chrominance pyramid. Typical filtering operations at each pyramid level include sigma filtering and median filtering.

It would thus be desirable to provide improved image enhancement methods, systems, and computer program products, which regulate speed vs. image quality tradeoffs so as to reduce objectionable artifacts and increase overall image quality.

SUMMARY OF THE INVENTION

The invention is defined by the claims. The invention, in broader aspects, provides an image enhancement method, in which a regular enhancement function and an aggressiveness parameter are computed using characteristics of a digital image. A first, relatively slow enhancement algorithm is applied to the digital image using the regular enhancement function, when an aggressiveness parameter is in a predetermined high range. A second, relatively fast enhancement algorithm is applied to the digital image using the regular enhancement function, when an aggressiveness parameter is in a predetermined low range. A modified enhancement function is calculated using characteristics of the digital image and is used with a second, relatively fast enhancement algorithm, when the aggressiveness parameter is in a predetermined medium range.

It is an advantageous effect of the invention that improved image enhancement methods, systems, and computer program products are disclosed, which regulate speed vs. image quality tradeoffs so as to reduce objectionable artifacts and increase overall image quality.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In image processing, a choice is often available between two or more alternative techniques that vary in speed and aggressiveness. The term "aggressiveness" and like terms are used herein to refer to the extent of changes made by particular image processing steps and procedures. The methods and systems herein utilize techniques that are divisible into two parts: an enhancement function and an enhancement algorithm.

An "enhancement algorithm", as the term is used herein, is an image science procedure that operates on an input digital image and has an enhancement function as another input. The enhancement algorithm produces a digital image that is in addition to or replaces the input digital image.

An "enhancement function" is an image science descriptor used by an enhancement algorithm that, along with the enhancement algorithm, produces a value or set of values as a function of an input digital image. The value or set of values are not a digital image.

The effects of the enhancement function and associated enhancement algorithm are not simply cumulative. The enhancement function used by an enhancement algorithm directly alters the operation of the enhancement algorithm. It is preferred that the input digital image used to create the enhancement function is the same image as the input digital image processed by the enhancement algorithm or some image derived from the input digital image. Different images can be used, but present a great risk of unpredictable results unless the images are very similar.

Both the enhancement function and the enhancement algorithm can be further modified one or more different ways to change one or both of speed and aggressiveness of the resulting technique. The modified enhancement function or functions along with the original or "regular" enhancement function can be considered to comprise a "family" of related enhancement functions. The original and modified enhancement algorithms provide a similar "family" of related enhancement algorithms. Each member of an enhancement function family can comprise different mathematical operations or can comprise the same mathematical operation, with different values of one or more parameters. Members of an enhancement algorithm family comprise different mathematical operations, have different speeds when using the same enhancement function, and differ in their tendencies to produce artifacts. The members of an enhancement function family also differ in their tendencies to produce artifacts. The term "modified" when used in reference to members of the enhancement algorithm and enhancement function families refers to a difference. A "modified" function or algorithm may or may not be a derivative of a respective "regular" algorithm or function.

In the methods and systems herein, an "aggressiveness parameter" is computed from the regular enhancement function. It is preferred that the regular enhancement function is relatively simple and fast to calculate so that the computation of the aggressiveness parameter does not itself become a limiting factor on the efficiency of the method.

Examples of image enhancement functions are operations that produce: one-dimensional look-up tables (color, tone, balance), three-dimensional look-up tables (color, tone, balance), color matrixes, FIR kernels, separable kernels for unsharp masking, noise tables incorporating a boost factor, and separable blur filters.

Examples of image enhancement algorithms are digital image enhancement operations that include: direct application of a one-dimensional look-up table to each member of a set of color planes, application of a one-dimensional look-up table to a low frequency sub-band of a luminance channel, direction application of three-dimensional look-up tables to color planes, application of a three-dimensional look-up table to a low frequency sub-band of a luminance channel, direction application of matrixes to color planes, application of a matrix look-up table to a low frequency sub-band of a color planes, adaptive sharpening, direct FIR sharpening of large kernels, direct FIR sharpening of small kernels, unsharp masking using separable kernels, adaptive noise reduction, simple blurring via separable or FIR filters.

Figure 1:
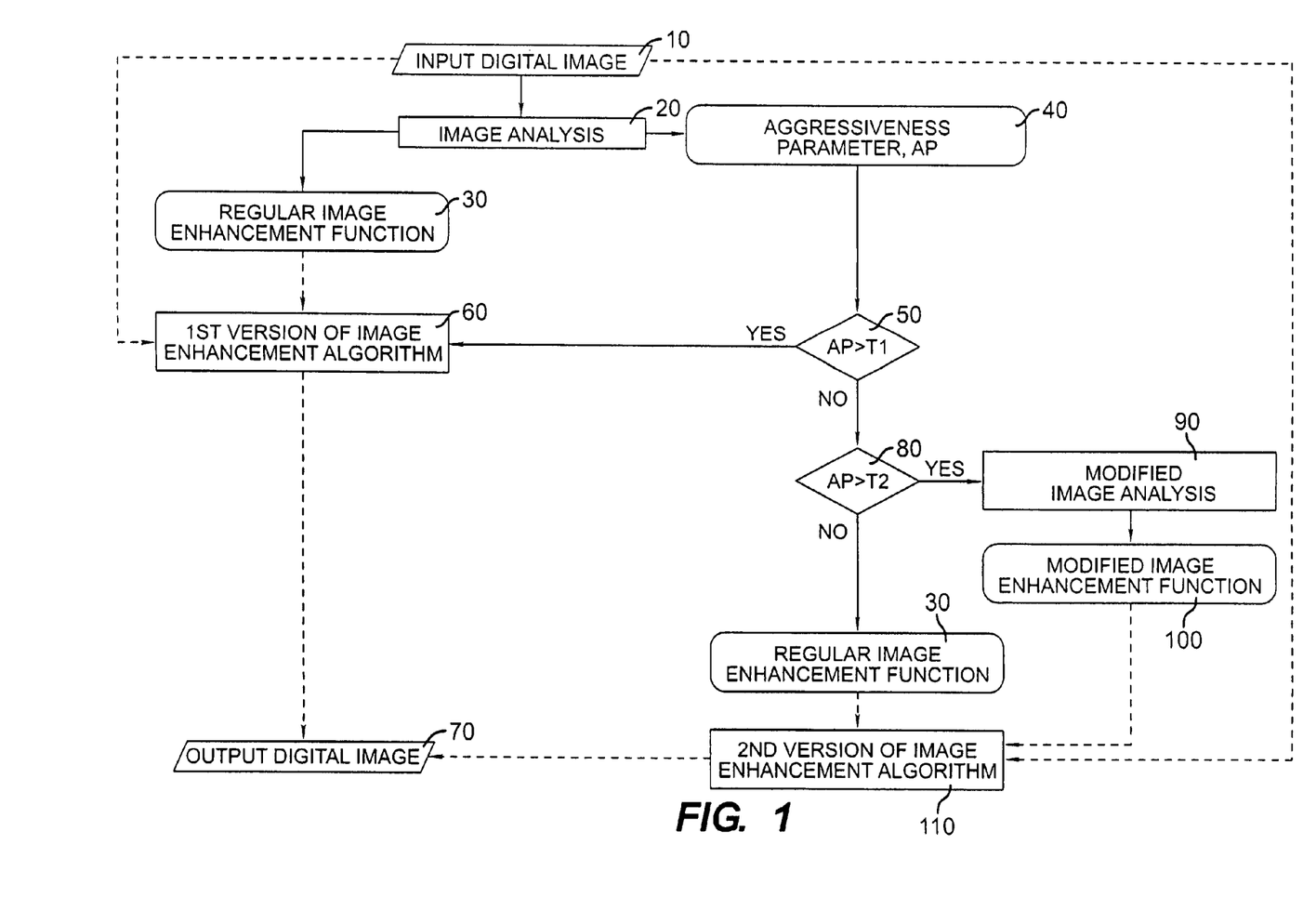
FIG. 1 is a functional block diagram showing an embodiment of the method.

Referring now to a particular embodiment shown in FIG. 1, an image analysis step 20 is applied to an input digital image 10 to determine a regular image enhancement function 30. The image analysis 20 determines values required for computation of the regular enhancement function. The aggressiveness parameter 40 is also generated by the image analysis step 20.

The value or values of the aggressiveness parameter relate to the magnitude of the image modifications that would be produced by the regular image enhancement function 30. This relationship can be a proportionality or can be more complex. For example, if the enhancement function is a look-up table, then the aggressiveness parameter is related to the difference between the look-up table and a corresponding identity look-up table.

The selection of an aggressiveness parameter can be made as a part of determining a suitable enhancement function and enhancement algorithm. Beyond this, the aggressiveness parameter can be selected heuristically, as convenient, based upon computational efficiency and the like. For example, if the enhancement function is a one-dimensional look-up table, a convenient aggressiveness parameter is the sum or weighted sum of the difference between the look-up table and the identity look-up table.

After the aggressiveness parameter has been calculated, the aggressiveness parameter is compared to two or more predetermined ranges of values. For convenience, these ranges are generally dealt with here in relation to predetermined thresholds, which divide the ranges.

Referring again to FIG. 1, if the aggressiveness parameter 40 is greater than a first threshold T1, as indicated in decision box 50, the regular image enhancement function 30 is applied to the input digital image 10 using a first version of the image enhancement algorithm 60 to form an output digital image 70. The first version of the image enhancement algorithm 60 is slower than a second version of the image enhancement algorithm 110, but produces superior results when the aggressiveness parameter 40 is greater than the first threshold T1.

When the determined aggressiveness parameter 40 is less than the first threshold T1 and greater than a second threshold T2, as indicated in decision box 80, a modified image analysis step 90 determines a modified image enhancement function 100. This modified image enhancement function 100 produces image modifications of a smaller magnitude. This modified image enhancement function 100 is applied using the second version of the image enhancement algorithm 110 to the input digital image 10 to form an output digital image 70. For images having aggressiveness parameter values in this range, the smaller magnitude image modifications associated with the modified image enhancement function 100 will generally produce output digital images 70 having fewer image artifacts than if the second version of the image enhancement algorithm 110 had been used to apply the more aggressive regular image enhancement function 30. As a result, the images produced with the modified image enhancement function 100 will generally be preferred to those that would have been produced using the more aggressive regular image enhancement function 30.

When the determined aggressiveness parameter 40 is less than the second threshold T2 as indicated in decision box 80, the original regular image enhancement function 30 can be used directly by the second version of the image enhancement algorithm 110 without modification. This is possible because when the regular image enhancement function 30 produces only modest image modifications, there will generally be only small differences between the images produced using the first version of the image enhancement algorithm 60 and the second version of the image enhancement algorithm 110. Since the second version of the image enhancement algorithm 110 is faster than the first version of the image enhancement algorithm 60, equivalent image quality can be obtained together with a faster processing speed.

As an alternative, when the determined aggressiveness parameter 40 is less than the second threshold T2 as indicated in decision box 80, the regular or modified image enhancement function can be used directly by the first version of the image enhancement algorithm 60. This alternative is a more conservative approach towards minimizing artifacts while maintaining image quality. With a modified image enhancement function 100, the output digital image 70 is not modified as much and the system as a whole is likely to be more robust against artifacts.

A determination of which of the above alternatives to use can be based upon a desired combination of computational speed and aggressiveness for a particular use. This, in turn, can be determined heuristically. If desired, the range (less than the second threshold T2) can be divided into two smaller ranges and the two alternative steps can each be applied in a predetermined range. These ranges can also be determined heuristically.

Referring back to FIG. 1, the image analysis step 20 analyzes the input digital image 10 to determine both a regular image enhancement function 30 and an aggressiveness parameter 40 (hereafter sometimes referred to collectively as "predictors") by characterizing particular traits of the input digital image 10. The aggressiveness parameter 40 can be determined directly from the input digital image, or can be calculated from the regular image enhancement function 30.

Depending on the form of the particular image enhancement algorithm, the image analysis step can take many forms. The computation of predictors typically includes a determination of one or more types of image statistics such as histograms of image code values and/or statistics generated from code values, such as minimum, maximum, mean, and median code values.

The image analysis step 20 can also use image metadata associated with the input digital image 10 in computing the predictors. Image metadata is ancillary (non-image) information that is associated with the digital image and relates to or supplements information in the digital image. Image metadata can be stored within the image file itself or can be separate. The metadata can include, but is not limited to information related to image capture, such as focal length, shutter speed, flash fire, ISO, time/date, and geographic location; and information relate to the digital file, such as compression setting and file size. The regular image enhancement function 30 represents regular image modifications such as recommended exposure adjustments, contrast adjustments, highlight/shadow tone scale adjustments, and the like.

In a particular example, the image enhancement algorithm is a tone scale modification algorithm and the enhancement function is a tone scale modification function computed from the pixel code values of the input digital image 10.

The regular enhancement function of this example is a tone scale curve generated in accordance with U.S. Pat. No. 6,285,798, to Lee. This tone scale curve reduces the dynamic range of the input digital image. In the generation of the tone scale curve, six constraints are established and then a successive integration procedure is performed to satisfy the constraints.

The red, green, and blue color channels are combined to form a luminance channel. The inner 75% of this luminance channel is extracted. From this center portion of the image, a cumulative histogram is formed using all pixels. Alternatively, edge pixels, non-clipped pixels, or some other selection or combination of selection of pixels can be used to form this cumulative histogram. A dark point determined by the 0.5% image cumulative histogram function value is mapped to a black paper density, a bright point determined by the 99.5% image cumulative histogram function value is mapped to a white paper density, and a mid-point is mapped to itself. In an 8 bit system, the black 0.5% point is mapped to the lowest code value, typically 0, the white 99.5% is mapped to the highest code value, typically 255, and the mid-point is mapped to itself, 128. Next a shadow slope constraint of greater than 1.0 is imposed at the 0.5% shadow point, a highlight slope constraint of 1.0 is imposed at the 99.5% highlight point, and a mid-tone slope constraint of 1.0 is imposed at the mid-point. The tone scale curve that satisfies the six constraints is constructed by assuming an arbitrary initial shape for the tone scale curve and successively convolving the tone scale curve with a Gaussian smoothing function until, upon examination, the tone scale curve satisfies the six constraints within a preset tolerance. A suitable tolerance can be determined heuristically. Other percentile points from this cumulative histogram can also be generated. For example, one can determine a shadow, mid-tone shadow, and extreme shadow point. Balance point and contrast pivot points can also be determined.

The modified tone scale function of this example is a tone scale curve generated in accordance with U.S. patent application Ser. No. 10/178,260, filed by Gindele. This tone scale has at least two tone scale segments defined relative to a reference point on the tone scale function, including a highlight tone scale segment and a shadow tone scale segment. The tone scale is generated using a first function with a monotonically decreasing slope characteristic to produce the highlight tone scale segment that includes points that are equal to or greater than the reference point; and using a second function with a monotonically increasing slope characteristic to produce the shadow tone scale segment that includes points that are equal to or less than the reference point.

In this example, the modified enhancement algorithm applies the applicable tone scale curve directly to the RGB color planes of the input digital image. The regular enhancement algorithm here is in accordance with U.S. patent application Ser. No. 10/607,401, in the name of Gallagher. This algorithm processes an input image to form an image pyramid having multiple image levels that includes receiving a base level image comprising pixel values at pixel locations arranged in rows and columns. Sample locations for a next level image in the pyramid are determined such that the sample locations are arranged in a regular pattern and the sample locations exceed the range of the pixel locations of the base level image. The pixel values of the next level image are determined by interpolating the pixel values of the base level image using an interpolation filter at the sample locations. The next level image is treated as the base level image and steps of determining sample locations and pixel values are repeated until a predetermined number of pyramid image levels are generated, or until a predetermined condition is met.

Another example is like the one just described, except that the enhancement algorithm in accordance with U.S. patent application Ser. No. 10/607,401, is replaced by an enhancement algorithm in accordance with U.S. Pat. No. 5,012,333.

In this example, the enhancement algorithm blurs the image neutral channel in order to create a low-pass signal. The low-pass signal is subtracted from the image neutral channel to produce a high-pass signal. The processed image is generated by applying the tone scale function to the low-pass signal and adding the result to the high-pass signal.

Other examples use the same algorithms as in the above examples, but have one or more different tone scale functions: such as those disclosed in U.S. patent application Ser. No. 10/246,856, filed Sep. 19, 2002; Ser. No. 10/263,113, filed Oct. 2, 2002; and Ser. No. 10/280,369, filed Oct. 25, 2002, all of which are hereby incorporated herein by reference.

Since it is generally important to maximize throughput when creating a digital imaging workflow, it is desirable to only use the slower, more complex technique when it provides a quality advantage that outweighs the reduction in system throughput. The method of the present invention provides a means to make the decision about when the slower version of the image enhancement algorithm should be run, and when it will be acceptable to apply the faster version of the image enhancement algorithm. In the first example discussed above, when the regular image enhancement function 30 corresponds to only small image modifications, there is very little difference between applying the look-up table directly to the color planes, or to the low-frequency band of the luminance channel.

The aggressiveness parameter 40 is a quantity that relates to the magnitude of the image modifications associated with the image enhancement function 30. For example, if the image enhancement function 30 is a one-dimensional look-up table, the aggressiveness parameter 40 can be the sum or weighted sum of the difference between the look-up table and the identity look-up table. Obviously, many other forms of the aggressiveness parameter 40 are possible. For example, in a particular embodiment, the aggressiveness parameter 40 can be determined from the maximum tone scale shift, or from the tone scale slope differences at various points in the tone scale.

Large values of the aggressiveness parameter 40 correlate with the regular image enhancement function 30 making big changes to the image. This generally means that the more complex first version of the image enhancement function 60 of applying the image enhancement function 30 (for example, applying the look-up table to a particular frequency band of the image) would deliver higher image quality results.

Small values of the aggressiveness parameter 40 correlate with the regular image enhancement function 30 making subtle changes to the image. This means that the faster second version of the image enhancement function 110 of applying the image enhancement function 30 (for example, applying the look-up table directly to the color planes of the image) would be preferred since using either the slower first version of the image enhancement function 60 or the faster second version of the image enhancement function 110 would deliver similar image quality results.

When the aggressiveness parameter ("AP") 40 is in an intermediate range (less than T1 in decision block 50, but greater than T2 in decision block 80), the second version of the image enhancement function 110 is used. The second version of the image enhancement function 110 is faster so this change increases processing speed.

When the aggressiveness parameter is in an intermediate range (less than T1 in decision block 50, but greater than T2 in decision block 80), a modified image analysis 90 is used to provide a modified image enhancement function 100, which is then used with the second version of the image enhancement algorithm 110. This may be based upon an assessment that there is some risk that artifacts will be produced if the regular image enhancement function 30 is too aggressive. This risk is mitigated by calling the modified image analysis routine 90, determining a modified image enhancement function 100, then applying this modified image enhancement function 100 to the input digital image 10 using the second version of the image enhancement algorithm 110. The modified image analysis routine 90 is designed to produce a less aggressive modified image enhancement function 100, thereby minimizing artifact occurrence than if the original regular image enhancement function 30 was simply applied using the second version of the image enhancement algorithm 110 to the input digital image 10.

In the particular tone scale example, the aggressiveness parameter is set to one minus the mid-tone slope of the tone scale image enhancement function. Low slopes, or slopes less than 0.7, necessitate the need of using the more complex first version image enhancement algorithm (application of tone scale function to the low frequency band of the luminance channel). Setting T1 to 0.3 ensures those images with aggressive tone scale functions will utilize the more complex first version image enhancement algorithm. Images with slopes greater than 0.85 can use the regular enhancement function along with a second version of image enhancement algorithm (application of the tone scale function to the color channels directly) with low risk of introducing artifacts. Setting T2 to 0.15 will ensure this. Images with slopes between 0.7 and 0.85 would benefit from using the more complex first version enhancement algorithm, but the benefit is marginal in many cases. If the regular enhancement function were used with these images in combination with the second version image enhancement algorithm, it is possible that artifacts would be introduced. Because image artifacts are highly undesirable, and image processing speed is often just as important as image quality, we can use the simpler second version image enhancement algorithm only if we modify the image enhancement function. Specifically, the modified image analysis routine 90 would apply a slope constraint to our enhancement function, creating a modified image enhancement function 100. This constraint limits the minimum slope to 0.85. Alternatively, the modified image analysis routine 90 can be a retuned version of the image analysis method 20 using alternate parameters designed to produce less aggressive image enhancement functions. Alternatively, the modified image analysis routine 90 can utilize an entirely different method for determining the modified image enhancement function 100.

In another embodiment of the present invention, the modified image analysis step 90 is applied iteratively to produce image modifications of increasingly smaller magnitude until the modified image enhancement function 100 produces image modifications that are sufficiently small so as not to produce objectionable artifacts when applied using the second version of the image enhancement algorithm 110. The images can be reviewed at each iteration by an operator or an automated routine can be provided for this purpose.

Another example of an image enhancement algorithm that can be used with the present invention is color correction. It has been shown that applying color correction to sufficiently noisy images will result in superior image quality if more accurate color correction is applied to the low frequency band of the image while less accurate (or no) color corrections can be applied to the higher frequency bands of the image (McCleary, "Methods to Reduce the Amplification of Random Noise in the Color Processing of Imager Data", IS&T's 2003 PICS Proceedings, pp. 50-57). Summarizing that procedure, Using the same techniques as previously described for tone scale image enhancement algorithms, a low frequency sub-band of the image and a higher frequency sub-band containing image texture and noise is generated. The regular image enhancement function is the computed color correction polynomial, matrix, three dimensional look-up table or similar. Often, these functions have high gammas or gains in certain regions of color space. The modified image analysis 90 creates modified image enhancement functions 100 by attenuating these high slope regions to minimize noise at the sacrifice of color accuracy.

In this case, the aggressiveness parameter, 40, will be a function of both the required color modification, as well as indicators of image noise. Generally, image noise will be dependent with density, and such indicators will vary with pixel code value. These noise indicators can be pre-calculated via pre-determined characterizations of the full capture path, or can be calculated on the fly on an image-by-image basis by sampling areas of the image and calculating noise statistics. The first version of the image enhancement algorithm 60 would be the application of the color modification to the lower frequency band of the input image 10; the second version of the image enhancement algorithm 110 would be the application of the color modification directly to the color planes of the input image. When the aggressiveness parameter 40 is between T1 and T2, the magnitude of the color change can be dampened such that when the modified image enhancement function 100 is applied directly to the input digital image 10 (no frequency split required), the resulting image contains less noise or objectionable artifacts.

Another example of an image enhancement algorithm that can be used with the present invention is an adaptive image sharpening algorithm. In this case, the image analysis step 20 would involve evaluating sharpness information for the input digital image 10 to determine a regular sharpening level. For example, it is well known how to generate a Modulation Transfer Function (MTF) from an edge trace. Several sample edge areas from the input image can be extracted, screened for goodness, averaged, then a first derivative filter is applied, and finally a Fourier Transform is applied, resulting with an input image MTF. An inverse filter can be computed from this MTF curve to get a unity response when this filter is applied to the input image. Alternatively, a filter can be calculated that, when applied to the input image, will obtain any desired aim response. In this case, the filter is the enhancement function, and the filter application method is the enhancement algorithm. High quality, but computationally intensive enhancement functions would include large FIR filters. The application of these FIR filters would be the regular enhancement algorithm. Lower quality, but computationally simple modified enhancement functions would include smaller FIR filters, separable filters, and separable unsharp mask filters. The corresponding modified enhancement algorithm applies these modified enhancement functions.

The aggressiveness parameter 40 can be a gain value associated with the recommended sharpening level. If small enough gain values are used, it will be possible to obtain acceptable image quality with smaller, separable sharpening filters. However, when larger gain values are needed, better image quality can be obtained by using larger filters that may be non-separable and non-linear, and therefore slower to implement. The thresholds T1 and T2 can therefore be adjusted to control which ranges of gain values are applied using the slower sharpening process, and which are applied using the faster sharpening process. In the intermediate gain region, the faster sharpening process would be used, but using a modified gain value or filter response.

Another example of an image enhancement algorithm that can be used with the present invention is an adaptive noise reduction algorithm. In this case, the image analysis step 20 would involve evaluating noise information from the input digital image 10 to determine a regular amount of noise reduction. An example of such a method is disclosed in U.S. patent application Ser. No. 10/151,623, filed May 20, 2002.

The aggressiveness parameter 40 can be a noise delta value associated with the amount of noise reduction necessary. If large amounts of noise reduction are required, the first version enhancement algorithm 60 can be a complex noise reduction algorithm such as in U.S. patent application Ser. No. 09/742,957, filed Dec. 20, 2000. In that method, a multi-resolution or pyramidal resolution series containing a single low resolution basis image and a series of texture images of increasing resolution is generated. At each level, the basis function is upsampled by two and summed with the next level texture function to yield the next level basis function. The modified enhancement algorithm 110 is a simple blurring operation such as a separable block averager. In this case, the regular enhancement function 30 has to be modified from one form to another by a translator. For example, the regular image enhancement function 30 can be a noise table or scale factor when the first version of image enhancement algorithm 60 is used, but translated to filter shape or size when the second version of image enhancement algorithm 110 is used. The job of the modified image analysis 90 is the same as previously described, to produce a dampened amount of noise reduction.

The aggressiveness parameter and associated thresholds (and the ranges determined by those thresholds) can be preset permanently for a system or can be adjustable. Adjustments can be automatic or the system can accept user input designating the desired settings. In the latter case, one or more images can be enhanced and then displayed on a monitor or the like. The system can have a user interface, such as a keyboard and pointing device, and changes can be accepted by the system, following an analysis of the images. Images can be reprocessed following adjustments, if desired. Image analysis can be made by eye or based upon a more complex analysis of output images provided by the system following enhancement. For example, in a production system, such as a wholesale photofinishing system, the aggressiveness parameter and associated thresholds can be adjusted on the basis of visual experiments. Psychophysical judging of resulting image quality and reinforcement learning techniques can be used to fine tune thresholds, or adjust them to a change of requirements or preference.

It is also possible to provide different thresholds for T1 and T2 values for specific applications, instantiations, or individual user preferences. These settings can be saved in typical database fashion on a local or remote system. In retail environments, unique customer values representing customer preferences can be saved locally, remotely, or even on customer loyalty cards. In all cases, the system reads input designating thresholds and aggressiveness parameters and then makes adjustments to match the input values of thresholds and the aggressiveness parameter.

Referring again to FIG. 1, to customize the image processing path to obtain the optimal speed vs. image quality tradeoff, the values of T1 and T2 in decision blocks 50 and 80 are customizable to change high, low, and medium ranges for the aggressiveness parameter. For example, if speed is of no concern, T1 in decision block 50 can be set to zero. This forces all processing to proceed via the more complex first version of the image enhancement algorithm 60. If speed is a big concern, T1 in decision block 50 can be set sufficiently high such that only images that strongly benefit from the more complex first version of the image enhancement algorithm go down this path, all others proceed down to the T2 decision block 80. The value of T2 in decision block 80 is then tuned to minimize objectionable artifacts in the resulting image. In instances where speed is more important than image quality, T1 in decision block 50 can be made sufficiently high such that all processing uses the faster second version of the image enhancement algorithm 110.

In situations where throughput is important, the first threshold value T1 is selected to achieve a desired average processing time for a certain image population by controlling the fraction of images that are processed using the slower first version of the image enhancement algorithm. Average processing times for images processed through the first and second enhancement algorithms can be computed and updated to enable initial and automatic adjustments of T1 to achieve desired average processing time. Ranges can be adjusted in the same manner in other embodiments to achieve the same result. In situations where image quality is important, the first threshold value is selected to achieve a desired image quality level for a certain image population by controlling the fraction of images that are processed using the first version of the image enhancement algorithm.

Image quality will mean different things to different applications. In environments with user interaction or when re-processing of the input image is convenient, image quality can be equated with user preference. In this case, ranges in the system can be adjusted to achieve maximum overall user preference at the risk of creating artifacts. If artifacts are introduced, the user can simply re-process the image. In environments where there is no user interaction, or where re-processing is not an option, artifact avoidance may be more important than achieving maximum overall user preference.

More complicated performance goals, such as a combination of best quality within a particular processing time limit, can also be achieved by changing ranges. Optimum ranges for a particular use can be readily determined heuristically.

Figure 2:
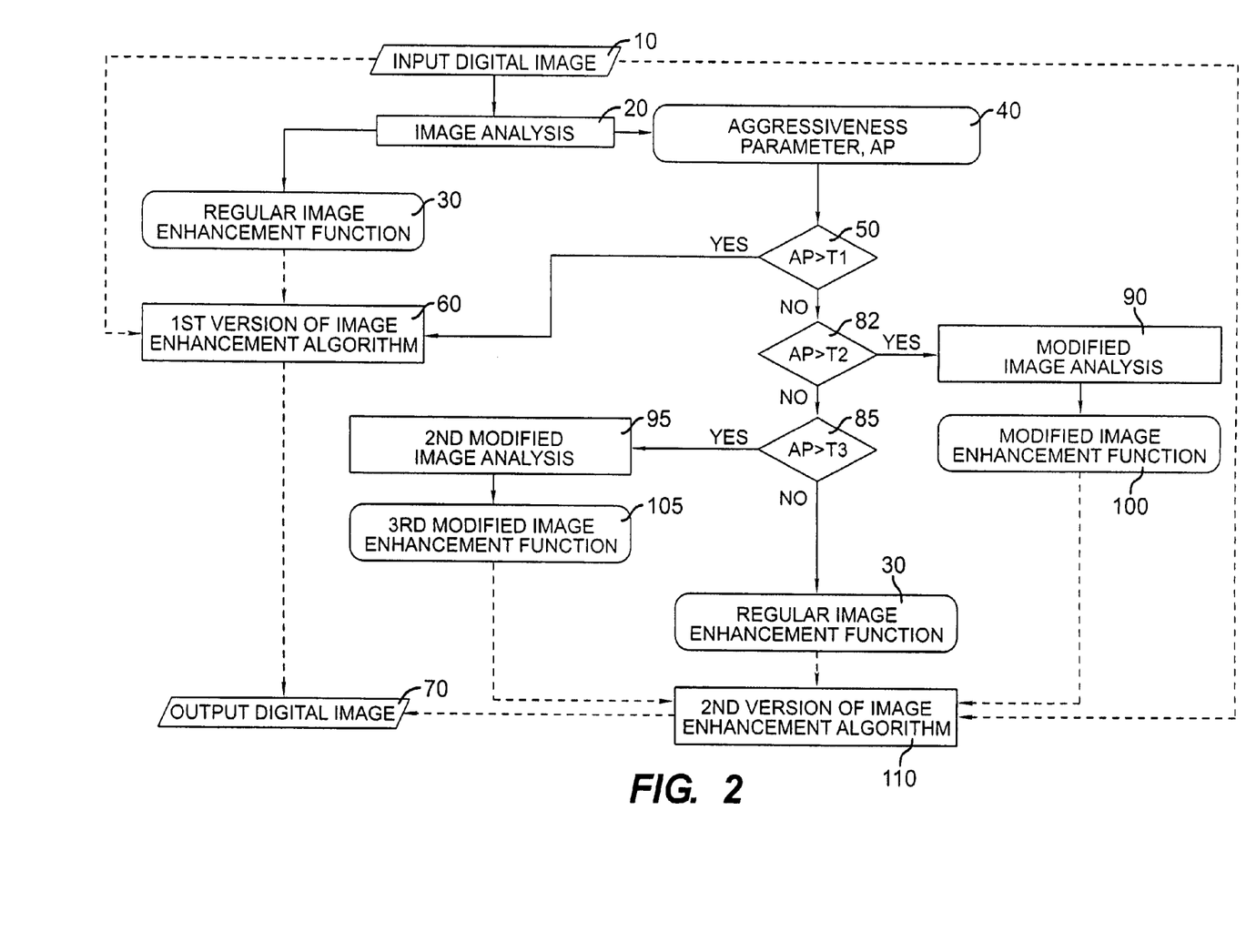
FIG. 2 is a functional block diagram showing another embodiment of the method.
Figure 3:
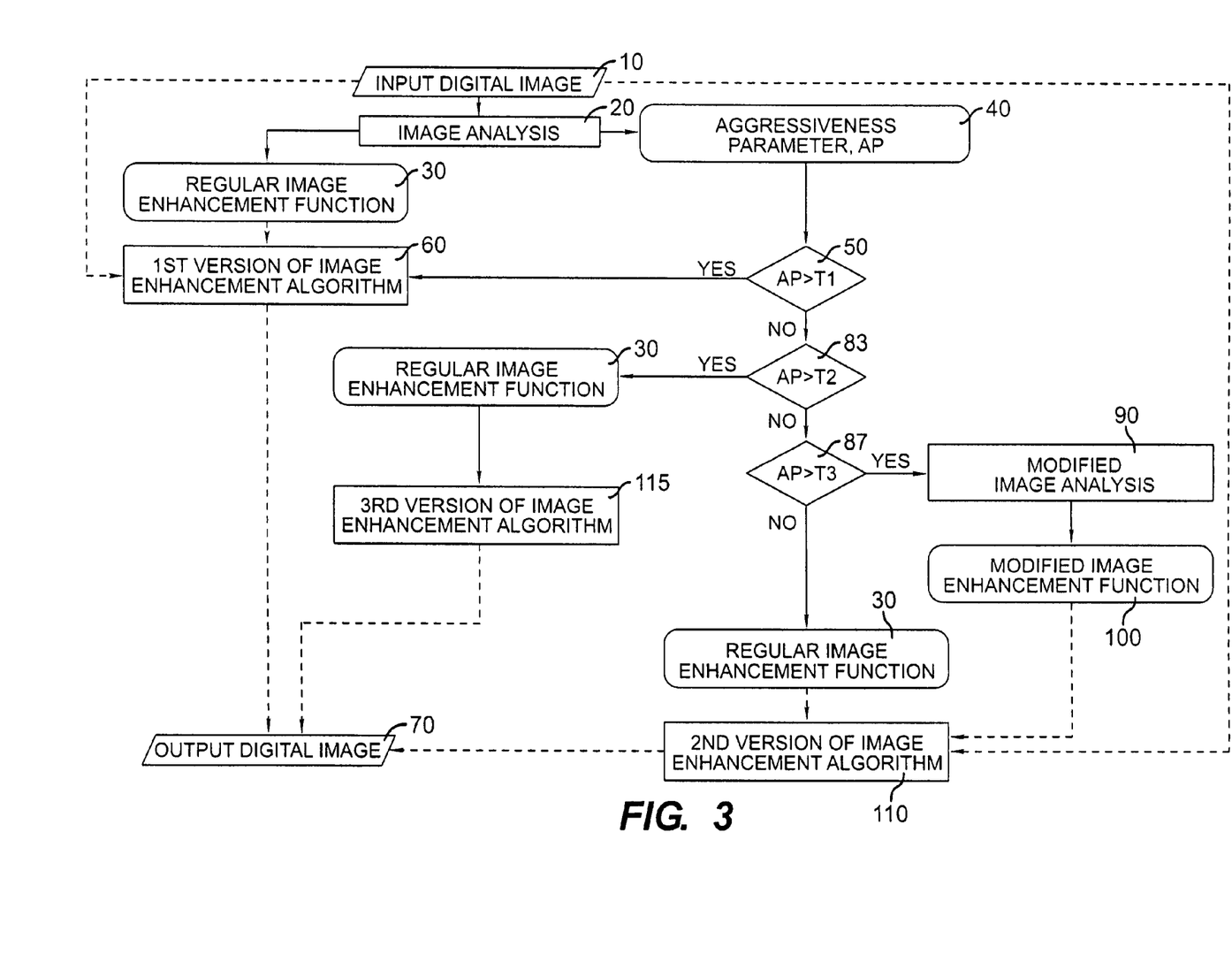
FIG. 3 is a functional block diagram showing still another embodiment of the method.
Figure 4:
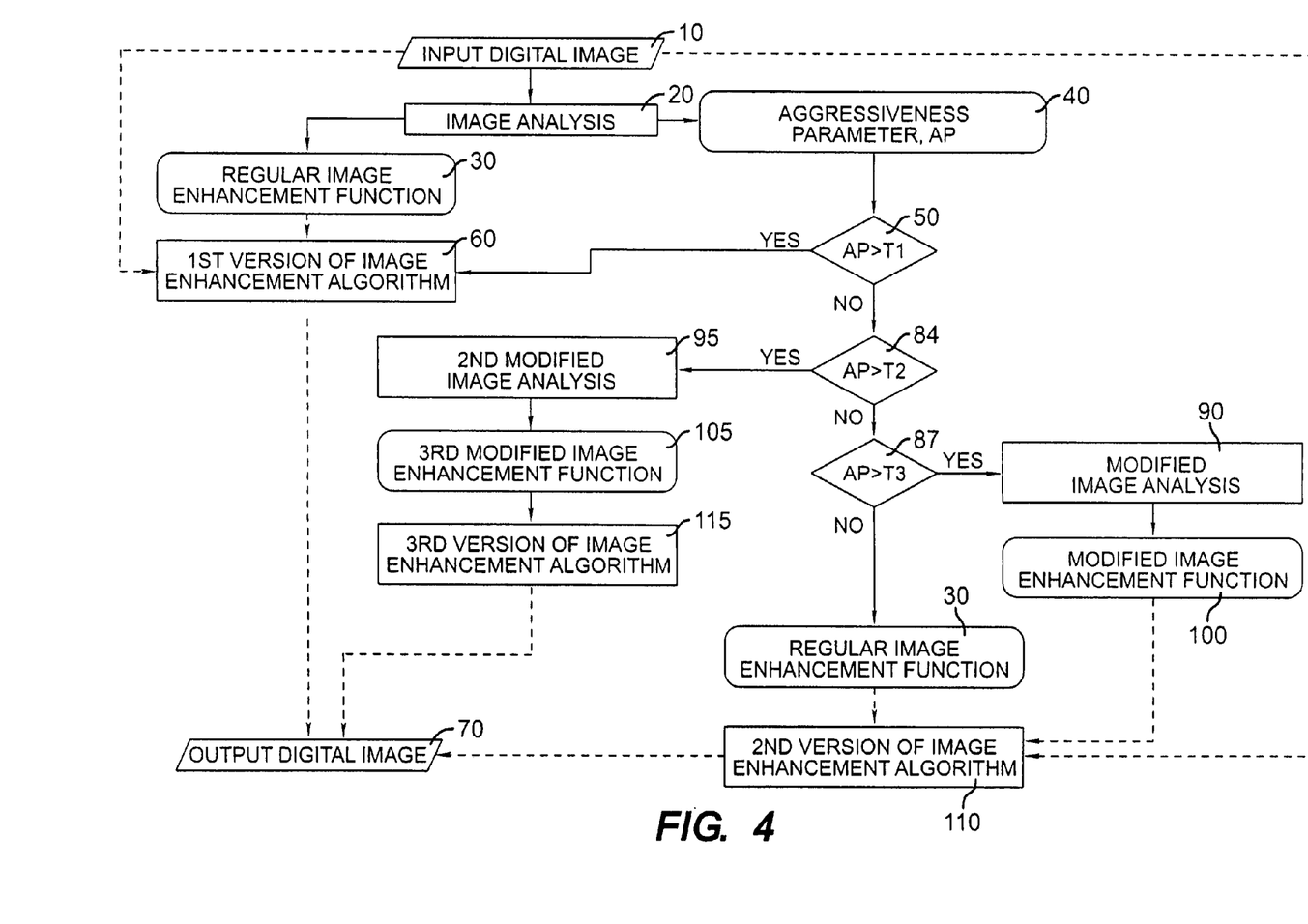
FIG. 4 is a functional block diagram showing yet another embodiment of the method.

The method can be extended to three or more decision blocks and thresholds, T1 through Tn, with various enumerations and combinations of image enhancement functions and image enhancement algorithms. FIG. 2 demonstrates an embodiment including three decision blocks, two modified image analysis procedures, and three image enhancement functions. FIG. 3 demonstrates an embodiment including three decision blocks and three image enhancement algorithms. FIG. 4 demonstrates an embodiment including three decision blocks, two modified image analysis procedures, three image enhancement functions, and three image enhancement algorithms.

In this description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The computer program may be stored in a computer readable storage medium, which may comprise, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 5:
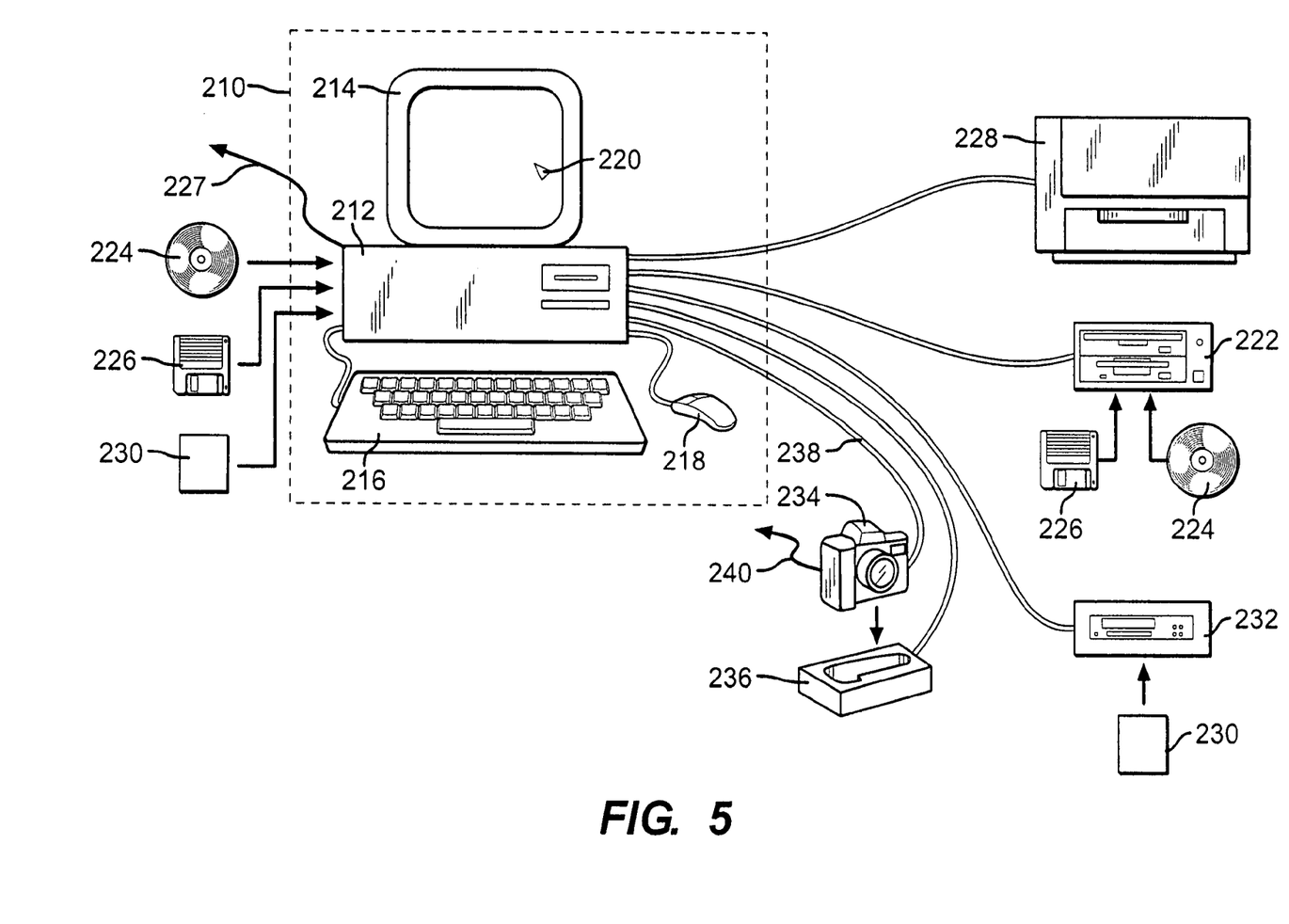
FIG. 5 is a schematic diagram of an embodiment of the system.

The present invention can be implemented in computer hardware and computerized equipment. For example, the method can be performed in a digital camera, a digital printer, and on a personal computer. Referring to FIG. 5, there is illustrated a computer system 210 for implementing the present invention. Although the computer system 210 is shown for the purpose of illustrating a preferred embodiment, the present invention is not limited to the computer system 210 shown, but may be used on any electronic processing system such as found in digital cameras, home computers, kiosks, retail or wholesale photofinishing, or any other system for the processing of digital images. The computer system 210 includes a microprocessor-based unit 212 (also referred to herein as a digital image processor) for receiving and processing software programs and for performing other processing functions. A display 214 is electrically connected to the microprocessor-based unit 212 for displaying user-related information associated with the software, e.g., by means of a graphical user interface. A keyboard 216 is also connected to the microprocessor based unit 212 for permitting a user to input information to the software. As an alternative to using the keyboard 216 for input, a mouse 218 may be used for moving a selector 220 on the display 214 and for selecting an item on which the selector 220 overlays, as is well known in the art.

A compact disk-read only memory (CD-ROM) 224, which typically includes software programs, is inserted into the microprocessor based unit for providing a means of inputting the software programs and other information to the microprocessor based unit 212. In addition, a floppy disk 226 including a software program is inserted into the microprocessor-based unit 212 for inputting the software program. The compact disk-read only memory (CD-ROM) 224 or the floppy disk 226 may alternatively be inserted into externally located disk drive unit 222, which is connected to the microprocessor-based unit 212. Still further, the microprocessor-based unit 212 may be programmed, as is well known in the art, for storing the software program internally. The microprocessor-based unit 212 may also have a network connection 227, such as a telephone line, to an external network, such as a local area network or the Internet. A printer 228 may also be connected to the microprocessor-based unit 212 for printing a hardcopy of the output from the computer system 210.

Images may also be displayed on the display 214 via a personal computer card (PC card) 230, such as, as it was formerly known, a PCMCIA card (based on the specifications of the Personal Computer Memory Card International Association), which contains digitized images electronically, embodied in the card 230. The PC card 230 is ultimately inserted into the microprocessor based unit 212 for permitting visual display of the image on the display 214. Alternatively, the PC card 230 can be inserted into an externally located PC card reader 232 connected to the microprocessor-based unit 212. Images may also be input via the compact disk 224, the floppy disk 226, or the network connection 227. Any images stored in the PC card 230, the floppy disk 226 or the compact disk 224, or input through the network connection 227, may have been obtained from a variety of sources, such as a digital camera (not shown) or a scanner (not shown). Images may also be input directly from a digital camera 234 via a camera docking port 236 connected to the microprocessor-based unit 212 or directly from the digital camera 234 via a cable connection 238 to the microprocessor-based unit 212 or via a wireless connection 240 to the microprocessor-based unit 212.

The output device provides a final image that has been subject to transformations. The output device can be a printer or other output device that provides a paper or other hard copy final image. The output device can also be an output device that provides the final image as a digital file. The output device can also include combinations of output, such as a printed image and a digital file on a memory unit, such as a CD or DVD.

The present invention can be used with multiple capture devices that produce digital images. For example, FIG. 5 can represent a digital photofinishing system where the image-capture device is a conventional photographic film camera for capturing a scene on color negative or reversal film, and a film scanner device for scanning the developed image on the film and producing a digital image. The capture device can also be an electronic capture unit (not shown) having an electronic imager, such as a charge-coupled device or CMOS imager. The electronic capture unit can have an analog-to-digital converter/amplifier that receives the signal from the electronic imager, amplifies and converts the signal to digital form, and transmits the image signal to the microprocessor-based unit 212.

The microprocessor-based unit 212 provides the means for processing the digital images to produce pleasing looking images on the intended output device or media. The present invention can be used with a variety of output devices that can include, but are not limited to, a digital photographic printer and soft copy display. The microprocessor-based unit 212 can be used to process digital images to make adjustments for overall brightness, tone scale, image structure, etc. of digital images in a manner such that a pleasing looking image is produced by an image output device. Those skilled in the art will recognize that the present invention is not limited to just these mentioned image processing functions.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described herein below as replacing original pixel values with processed pixel values is functionally equivalent to describing the same processing steps as generating a new digital image with the processed pixel values while retaining the original pixel values.

The general control computer shown in FIG. 5 can store the present invention as a computer program product having a program stored in a computer readable storage medium, which may include, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention may also be stored on any other physical device or medium employed to store a computer program indicated by offline memory device.

It should also be noted that the present invention can be implemented in a combination of software and/or hardware and is not limited to devices, which are physically connected and/or located within the same physical location. One or more of the devices illustrated in FIG. 5 can be located remotely and can be connected via a network. One or more of the devices can be connected wirelessly, such as by a radio-frequency link, either directly or via a network.

The present invention may be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention may stand alone or may be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

The invention has been described in detail with particular reference to certain preferred embodiments thereof, but it will be understood that variations and modifications can be effected within the spirit and scope of the invention.

The invention claimed is:

1. An image enhancement method having first and second enhancement algorithms, said method comprising:
executing by a data processing system the steps of:
computing a regular enhancement function and an aggressiveness parameter based upon characteristics of a digital image;
applying said first enhancement algorithm to said digital image using said regular enhancement function, when said aggressiveness parameter is in a predetermined high range;
applying said second enhancement algorithm to said digital image using said regular enhancement function, when said aggressiveness parameter is in said predetermined low range;
computing a modified enhancement function, when said aggressiveness parameter is in a predetermined medium range between said high range and said low range;
applying said second enhancement algorithm using said modified enhancement function, when said aggressiveness parameter is in a predetermined medium range between said high range and said low range;
wherein said first enhancement algorithm is relatively slow and said second enhancement algorithm is relatively fast; and
wherein said aggressiveness parameter is based upon said digital image and said regular enhancement function.

2. The method of claim 1 wherein said regular enhancement function is relatively more aggressive and said modified enhancement function is relatively less aggressive.

3. The method of claim 1 wherein said modified enhancement function is based upon characteristics of one of said digital image and said regular enhancement function.

4. The method of claim 1 wherein said computing of said modified enhancement function is concurrent with said computing of said regular enhancement function.

5. The method of claim 1 further comprising applying a third enhancement algorithm when said aggressiveness parameter is in a predetermined additional range exclusive of said low, medium, and high ranges, said third enhancement algorithm being different than said first and second enhancement algorithms.

6. The method of claim 5 wherein said third enhancement algorithm uses said regular enhancement function.

7. The method of claim 5 further comprising computing an additional enhancement function based upon characteristics of said digital image, said functions all being different, and wherein said applying of said third enhancement algorithm uses said additional enhancement function.

8. The method of claim 7 further comprising:
determining that said aggressiveness parameter is in said additional range; and
computing said additional enhancement function following said determining.

9. An image enhancement method having first and second enhancement algorithms, said method comprising:
executing by a data processing system the steps of:
computing a regular enhancement function and an aggressiveness parameter based upon characteristics of a digital image;
applying said first enhancement algorithm to said digital image using said regular enhancement function, when said aggressiveness parameter is in a predetermined high range;
applying said second enhancement algorithm to said digital image using said regular enhancement function, when said aggressiveness parameter is in said predetermined low range;
computing a modified enhancement function, when said aggressiveness parameter is in a predetermined medium range between said high range and said low range;
applying said second enhancement algorithm using said modified enhancement function, when said aggressiveness parameter is in a predetermined medium range between said high range and said low range;

wherein said first enhancement algorithm is relatively slow and said second enhancement algorithm is relatively fast; and wherein said computing of said aggressiveness parameter further comprises deriving said aggressiveness parameter from said regular enhancement function.

10. An image enhancement method having first and second enhancement algorithms, said method comprising:

executing by a data processing system the steps of:

computing a regular enhancement function and an aggressiveness parameter based upon characteristics of a digital image;

applying said first enhancement algorithm to said digital image using said regular enhancement function, when said aggressiveness parameter is in a predetermined high range;

applying said second enhancement algorithm to said digital image using said regular enhancement function, when said aggressiveness parameter is in said predetermined low range;

computing a modified enhancement function, when said aggressiveness parameter is in a predetermined medium range between said high range and said low range;

applying said second enhancement algorithm using said modified enhancement function, when said aggressiveness parameter is in a predetermined medium range between said high range and said low range;

wherein said first enhancement algorithm is relatively slow and said second enhancement algorithm is relatively fast;

repeating said steps with a plurality of additional digital images;

calculating average durations of said steps; and adjusting said ranges until said average durations match predetermined goals.

11. The method of claim 1 wherein one or more of said ranges are selected to limit artifacts to a predetermined level.

12. The method of claim 1 wherein at least one of said enhancement functions is user-adjustable prior to said applying.

13. The method of claim 1 wherein said enhancement algorithm is an adaptive algorithm.

14. The method of claim 1 wherein said enhancement algorithm is one of a tone-scale modification algorithm, a color correction algorithm, a sharpening algorithm, and a noise reduction algorithm.

15. An image enhancement system for use with first and second enhancement algorithms, said system comprising:

means for computing a regular enhancement function and an aggressiveness parameter based upon characteristics of a digital image;

means for applying said first enhancement algorithm to said digital image using said regular enhancement function, when said aggressiveness parameter is in a predetermined high range;

means for applying said second enhancement algorithm to said digital image using said regular enhancement function, when said aggressiveness parameter is in said predetermined low range;

means for computing a modified enhancement function, when said aggressiveness parameter is in a predetermined medium range between said high range and said low range;

means for applying said second enhancement algorithm using said modified enhancement function, when said aggressiveness parameter is in a predetermined medium range between said high range and said low range;

wherein said first enhancement algorithm is relatively slow and said second enhancement algorithm is relatively fast, and said regular enhancement function is relatively more aggressive and said modified enhancement function is relatively less aggressive; and wherein said aggressiveness parameter is computed based upon said digital image and said regular enhancement function.

16. A method for enhancing a digital image, said method comprising:

executing by a data processing system the steps of:

selecting an image enhancement, said enhancement having regular and modified alternative enhancement functions and first and second alternative enhancement algorithms;

classifying the digital image as one of a high aggressiveness category, medium aggressiveness category, and low aggressiveness category;

applying said first enhancement algorithm using said regular enhancement function when said digital image is in said high aggressiveness category;

applying said second enhancement algorithm using said modified enhancement function, when said digital image in said low aggressiveness category; and applying said second enhancement algorithm using said regular enhancement function, when said digital image is in said medium aggressiveness category;

wherein said classifying further comprises calculating an aggressiveness parameter of the digital image and assigning said digital image to one of said categories based upon the value of said aggressiveness parameter; and wherein said aggressiveness parameter is calculated based upon said digital image and said regular enhancement function.

17. The method of claim 16 wherein said first enhancement algorithm is relatively slow and said second enhancement algorithm is relatively fast.

18. The method of claim 16 wherein said assigning further comprises comparing said value of said aggressiveness parameter to a plurality of predetermined thresholds.

19. The method of claim 18 further comprising:

displaying the digital image following said applying; and changing said thresholds following said displaying.

20. An image enhancement method having first and second enhancement algorithms, said method comprising:

executing by a data processing system the steps of:

computing a regular enhancement function and an aggressiveness parameter based upon characteristics of a digital image;

applying said first enhancement algorithm to said digital image using said regular enhancement function, when said aggressiveness parameter is in a predetermined high range;

applying said second enhancement algorithm to said digital image using said regular enhancement function, when said aggressiveness parameter is in said predetermined low range;

computing a modified enhancement function, when said aggressiveness parameter is in a predetermined medium range between said high range and said low range;

applying said first enhancement algorithm using said modified enhancement function, when said aggressiveness parameter is in a predetermined medium range between said high range and said low range;

wherein said first enhancement algorithm is relatively slow and said second enhancement algorithm is relatively fast; and wherein said aggressiveness parameter is calculated based upon said digital image and said regular enhancement function.

21. A method for enhancing a plurality of digital images, said method comprising:

executing by a data processing system the steps of:

computing, based upon characteristics of each digital image, a regular enhancement function, a modified enhancement function, and an aggressiveness parameter applicable to the respective image;

applying a first enhancement algorithm using said regular enhancement function to ones of said digital images having a respective said aggressiveness parameter is a high range;

applying a second enhancement algorithm using said regular enhancement function to ones of said digital images having a respective said aggressiveness parameter in a low range;

applying said second enhancement algorithm using said modified enhancement function to ones of said digital images having a respective said aggressiveness parameter in a medium range between said high range and said low range;

wherein said first enhancement algorithm is relatively slow and said second enhancement algorithm is relatively fast; and wherein said aggressiveness parameter is calculated based upon said digital image and said regular enhancement function.

22. The method of claim 21 further comprising accepting input designating said ranges.

23. The method of claim 22 further comprising the steps of:

displaying one of more of said images following respective said applying steps; and changing said ranges following said displaying.

24. The method of claim 22 wherein said accepting further comprises reading said input from removable storage media.

25. The method of claim 22 wherein said accepting further comprises reading said input from a database entry associated with an individual user.

26. The method of claim 22 further comprising:

automatically adjusting said ranges to meet one or more predetermined goals.

27. The method of claim 22 further comprising:

determining an image quality level of said digital images following respective said applying steps; and adjusting said ranges until said image quality level meets a predetermined goal.

28. A method for enhancing a plurality of digital images, said method comprising:

executing by a data processing system the steps of:

computing, based upon characteristics of each digital image, a regular enhancement function, a modified enhancement function, and an aggressiveness parameter applicable to the respective image;

applying a first enhancement algorithm using said regular enhancement function to ones of said digital images having a respective said aggressiveness parameter is a high range;

applying a second enhancement algorithm using said regular enhancement function to ones of said digital images having a respective said aggressiveness parameter in a low range;

applying said second enhancement algorithm using said modified enhancement function to ones of said digital images having a respective said aggressiveness parameter in a medium range between said high range and said low range;

accepting input designating said ranges;

determining an average processing time of said digital images, said average processing time being inclusive of respective said computing and applying steps; and adjusting said ranges until said average processing time meets a predetermined goal;

wherein said first enhancement algorithm is relatively slow and said second enhancement algorithm is relatively fast.

29. The method of claim 9 wherein said regular enhancement function is relatively more aggressive and said modified enhancement function is relatively less aggressive.

30. The method of claim 9 wherein said modified enhancement function is based upon characteristics of one of said digital image and said regular enhancement function.

31. The method of claim 9 wherein said computing of said modified enhancement function is concurrent with said computing of said regular enhancement function.

32. The method of claim 9 further comprising applying a third enhancement algorithm when said aggressiveness parameter is in a predetermined additional range exclusive of said low, medium, and high ranges, said third enhancement algorithm being different than said first and second enhancement algorithms.

33. The method of claim 32 wherein said third enhancement algorithm uses said regular enhancement function.

34. The method of claim 32 further comprising computing an additional enhancement function based upon characteristics of said digital image, said functions all being different, and wherein said applying of said third enhancement algorithm uses said additional enhancement function.

35. The method of claim 34 further comprising:

determining that said aggressiveness parameter is in said additional range; and computing said additional enhancement function following said determining.

36. The method of claim 9 further comprising: repeating said steps with a plurality of additional digital images;

calculating average durations of said steps; and adjusting said ranges until said average durations match predetermined goals.

37. The method of claim 9 wherein one or more of said ranges are selected to limit artifacts to a predetermined level.

38. The method of claim 9 wherein at least one of said enhancement functions is user-adjustable prior to said applying.

39. The method of claim 9 wherein said enhancement algorithm is an adaptive algorithm.

40. The method of claim 9 wherein said enhancement algorithm is one of a tone-scale modification algorithm, a color correction algorithm, a sharpening algorithm, and a noise reduction algorithm.

41. The method of claim 1 further comprising:

repeating said steps with a plurality of additional digital images;

calculating average durations of said steps; and adjusting said ranges until said average durations match predetermined goals.

42. The method of claim 10 wherein said regular enhancement function is relatively more aggressive and said modified enhancement function is relatively less aggressive.

43. The method of claim 10 wherein said modified enhancement function is based upon characteristics of one of said digital image and said regular enhancement function.

44. The method of claim 10 wherein said computing of said modified enhancement function is concurrent with said computing of said regular enhancement function.

45. The method of claim 10 further comprising applying a third enhancement algorithm when said aggressiveness parameter is in a predetermined additional range exclusive of said low, medium, and high ranges, said third enhancement algorithm being different than said first and second enhancement algorithms.

46. The method of claim 45 wherein said third enhancement algorithm uses said regular enhancement function.

47. The method of claim 45 further comprising computing an additional enhancement function based upon characteristics of said digital image, said functions all being different, and wherein said applying of said third enhancement algorithm uses said additional enhancement function.

48. The method of claim 47 further comprising determining that said aggressiveness parameter is in said additional range; and computing said additional enhancement function following said determining.

49. The method of claim 10 wherein one or more of said ranges are selected to limit artifacts to a predetermined level.

50. The method of claim 10 wherein at least one of said enhancement functions is user-adjustable prior to said applying.

51. The method of claim 10 wherein said enhancement algorithm is an adaptive algorithm.

52. The method of claim 10 wherein said enhancement algorithm is one of a tone-scale modification algorithm, a color correction algorithm, a sharpening algorithm, and a noise reduction algorithm.

53. An image enhancement system for use with first and second enhancement algorithms, said system comprising:
  means for computing a regular enhancement function and an aggressiveness parameter based upon characteristics of a digital image;
  means for applying said first enhancement algorithm to said digital image using said regular enhancement function, when said aggressiveness parameter is in a predetermined high range;
  means for applying said second enhancement algorithm to said digital image using said regular enhancement function, when said aggressiveness parameter is in said predetermined low range;
  means for computing a modified enhancement function, when said aggressiveness parameter is in a predetermined medium range between said high range and said low range;
  means for applying said second enhancement algorithm using said modified enhancement function, when said aggressiveness parameter is in a predetermined medium range between said high range and said low range;
  wherein said first enhancement algorithm is relatively slow and said second enhancement algorithm is relatively fast, and said regular enhancement function is relatively more aggressive and said modified enhancement function is relatively less aggressive; and
  wherein said computing of said aggressiveness parameter further comprises deriving said aggressiveness parameter from said regular enhancement function.

54. A method for enhancing a digital image, said method comprising:
  executing by a data processing system the steps of:
  selecting an image enhancement, said enhancement having regular and modified alternative enhancement functions and first and second alternative enhancement algorithms;
  classifying the digital image as one of a high aggressiveness category, medium aggressiveness category, and low aggressiveness category;
  applying said first enhancement algorithm using said regular enhancement function when said digital image is in said high aggressiveness category;
  applying said second enhancement algorithm using said modified enhancement function, when said digital image in said low aggressiveness category; and
  applying said second enhancement algorithm using said regular enhancement function, when said digital image is in said medium aggressiveness category;
  wherein said classifying further comprises calculating an aggressiveness parameter of the digital image and assigning said digital image to one of said categories based upon the value of said aggressiveness parameter; and
  wherein said calculating of said aggressiveness parameter further comprises deriving said aggressiveness parameter from said regular enhancement function.

55. An image enhancement method having first and second enhancement algorithms, said method comprising:
  executing by a data processing system the steps of:
  computing a regular enhancement function and an aggressiveness parameter based upon characteristics of a digital image;
  applying said first enhancement algorithm to said digital image using said regular enhancement function, when said aggressiveness parameter is in a predetermined high range;
  applying said second enhancement algorithm to said digital image using said regular enhancement function, when said aggressiveness parameter is in said predetermined low range;
  computing a modified enhancement function, when said aggressiveness parameter is in a predetermined medium range between said high range and said low range;
  applying said first enhancement algorithm using said modified enhancement function, when said aggressiveness parameter is in a predetermined medium range between said high range and said low range;
  wherein said first enhancement algorithm is relatively slow and said second enhancement algorithm is relatively fast;
  wherein said computing of said aggressiveness parameter further comprises deriving said aggressiveness parameter from said regular enhancement function.

56. A method for enhancing a plurality of digital images, said method comprising:
  executing by a data processing system the steps of:
  computing, based upon characteristics of each digital image, a regular enhancement function, a modified enhancement function, and an aggressiveness parameter applicable to the respective image;
  applying a first enhancement algorithm using said regular enhancement function to ones of said digital images having a respective said aggressiveness parameter is a high range;

applying a second enhancement algorithm using said regular enhancement function to ones of said digital images having a respective said aggressiveness parameter in a low range;

applying said second enhancement algorithm using said modified enhancement function to ones of said digital images having a respective said aggressiveness parameter in a medium range between said high range and said low range;

wherein said first enhancement algorithm is relatively slow and said second enhancement algorithm is relatively fast; and wherein said computing of said aggressiveness parameter further comprises deriving said aggressiveness parameter from said regular enhancement function.

* * * * *